Patented July 10, 1928.

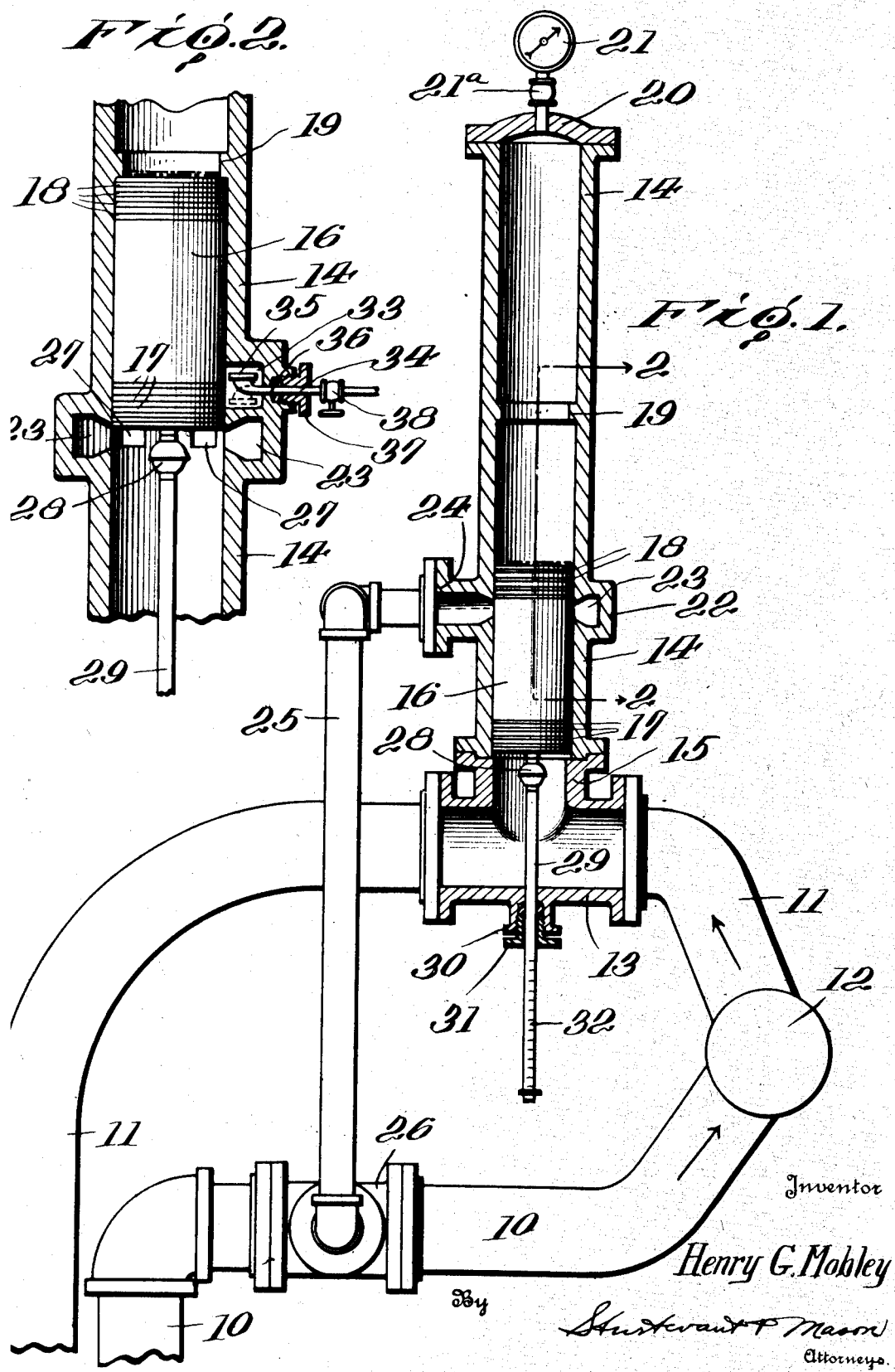

1,676,999

UNITED STATES PATENT OFFICE.

HENRY G. MOBLEY, OF LEAGUE CITY, TEXAS.

PRESSURE-RELIEF APPARATUS.

Application filed May 24, 1926. Serial No. 111,441.

This invention relates to pressure relief apparatus for use on pipe lines, and more particularly bears upon a structure adapted to open a by-pass between high and low pressure pipe lines whereby damage to the high pressure pipe line by reason of excessive pressure may be avoided.

One of the objects of this invention is to provide a pressure relief device having an air cushion which may be adjusted as desired.

A further feature of this invention is the provision of a piston valve for use as an automatic pressure relief or by-pass valve between high and low pressure pipe lines.

Another feature of this invention is the provision of a pressure relief valve having a long stroke, and adapted to operate rapidly in relieving the excessive pressure, but being securely seated during lower pressures.

Still another feature of the invention is the provision of an indicating device whereby the position of the piston valve may be determined from the exterior at a considerable distance.

With these and other objects in view as will be set forth hereinafter, one form of the invention is represented on the accompanying drawings, as applied to a pressure pump which receives a fluid from a low pressure pipe line and delivers it to a high pressure pipe line, the pressure relief apparatus establishing an automatic by-pass between the lines, in the event of excessive pressures in the high pressure line. This has been illustrated by way of example as applied to an oil pump and an oil pipe line, but it will be understood that the invention may be applied generally to automatically relieve excessive pressures of any fluid.

Figure 1 is a diagrammatic view of the pipe line and pump system, with the automatic pressure relief apparatus in section, with the piston valve in the lowermost position.

Fig. 2 is a section on line 2—2 of Fig. 1, on a somewhat larger scale, with the piston valve in the uppermost position.

On these drawings, the low pressure pipe line 10 may for example be an incoming pipe line conveying oil in a transcontinental system, while the high pressure pipe line 11 is the outgoing pipe leading to the next pumping station or to the discharge. The low pressure pipe line 10 leads directly to a pumping apparatus 12 which is indicated conventionally and may be of any well known type adapted to receive the oil from the pipe line 10 and deliver it under an increased pressure to the pipe line 11.

Mounted in the high pressure pipe line 11 is a connecting T 13 which is held in sealed relation by suitable flanges and packing joints to the cylinder 14 of the pressure relief apparatus. This cylinder is preferably of a slightly larger internal diameter than the bore of the corresponding portion 15 of the T 13, so that the portion 15 of the T forms a shoulder at the end of the cylinder when the parts are assembled together. A piston valve 16 is seated within the cylinder 14 and is provided with the usual sealing rings 17 and 18 at its lower and upper ends to form a tight seal within the interior of the cylinder 14.

Intermediate its length, the cylinder 14 has an inwardly projecting flange 19 which serves as a stop to limit the upward movement of the piston valve, and it will be understood that the shoulder formed by the difference in diameters between the cylinder 14 and the portion 15 of the T 13 constitutes a stop for the piston valve during its downward movement. The upper end of the cylinder 14 is closed by a hermetically sealed cap 20 which preferably has a manometer or pressure gauge 21 connected with the interior of the cylinder 14 through a valve 21ª. A belt 22 is formed integrally with the cylinder 14 and has the annular passage 23 therein which communicates through the hollow flange connection 24 with the by-pass pipe 25 which leads back to a T connection 26 in the low pressure pipe line 10. The passage 23 has a number of ports 27, 27, (Fig. 2) which open into the interior of the cylinder 14 at such a distance from the lower end thereof and from the flange 19 that they are closed when the piston valve is in its lower positions, and are uncovered when the piston valve has moved to its upper position, as shown in Fig. 2. A ball joint 28 is connected to the lower end of the piston valve and receives a stem 29 which passes through an aperture in the T 13 and to the exterior; this aperture is closed against leakage by a suitable packing 30 having a jam nut 31. The outer end or rod 32 of the stem 29 is suitably graduated and marked so that the distance or extent by which this rod 32 projects to the exterior is a measure of the prevailing position of the piston valve 16 within the interior of the cylinder 14. The ball joint 28 corrects for any slight irregularities in the assembly.

A cavity 33 is formed in the wall of the cylinder 14 a sufficient distance above the ports 27 so that it is always closed by the piston valve 16 in its upper position, but is uncovered by this piston valve when the latter passes into the lower position. A pipe 34 passes through the wall of the cylinder 14 into this recess 33 and at its inner end carries an elbow 35 for the purpose of regulating the level of oil within the upper portion of cylinder 14, as will be described hereinafter. This pipe 34 passes through a packing 36 and the jam nut 37 which maintains a tight sealing of the pipe with respect to the interior of the cylinder 14. A valve 38 is provided in the pipe line to shut it off at will.

The method of operation of this device is as follows:

The piston valve 16 is drawn to its lowermost position, i. e., against the portion 15 of the T 13, by traction on the rod 32 if necessary, or in other suitable manner. It will be understood that at this time the pipe line 11 is substantially without pressure and this operation is easy. A quantity of lubricating oil is then forced in through the pipe 34 and is received on the top of the piston valve 16 and in the cavity 33, and thereafter serves to assure tightness of the piston valve 16 within the cylinder 14. Compressed air is then blown into the upper portion of the cylinder 14 through this same pipe 34; this air may be obtained from any suitable source such as a hand or power air pump or the like, until the pressure gauge 21 reaches a predetermined pressure which has been found suitable to maintain a predetermined maximum pressure within the high pressure pipe line 11 during operation. By the position of the head 35, the operator may regulate from the outside the exact level of lubricating oil contained in the cylinder 14, since oil present in the cylinder above this position may flow back through the pipe 34. The pipe 34 is then rotated within the packing 36 and the nut 37 until it is in the position shown in dotted lines in Fig. 2: the valve 38 is maintained closed except while oil or air is being introduced into the cylinder 14. If the low pressure pipe line 10 now delivers oil to the pump 12, and the latter be actuated to force this oil under a considerable pressure into the high pressure pipe 11, it will be understood that the pressure within the pipe line 11 will build up until the piston valve 16 is forced upward against the air pressure in the upper portion of the cylinder 14. This upward movement of the piston 16 will be indicated at the exterior by the movement of the rod 32. When the pipe line 11 is at the maximum predetermined position of safety, the piston valve 16 will be suspended within the cylinder 14 at a position in which its lower end barely covers the ports 27; it is maintained in this position by the air pressure above it and by the oil pressure below it, and it is apparent that by regulating the air pressure in the upper end of the cylinder 14, the relative pressure within the pipe line 11 at which this position of the valve 16 is maintained may be regulated at the will of the operator.

If a pressure in excess of this occurs within the pipe line 11, the piston valve 16 is moved further upward and a portion of the oil contained within the pipe 11 and beneath the piston 16 is permitted to pass through the ports 27 into the annular passage 23 and thence through by-pass pipe 25 back to the low pressure pipe line 10, whereby any injury or damage to either the pipe line or the pump and engine are avoided. While the pressure in line 11 is below maximum the apparatus acts as an alleviator to absorb the shocks or pulsations due to the operation of the pump 12, thus to a great extent relieving the pressure line 11 of excessive vibration and pressure due to the normal operation of the pump.

It will be understood that the invention is not limited to the specific embodiment shown, but that it may be modified within the scope of the appended claims.

I claim:

1. In a pressure control device for a pipe line, a T in said line, a cylinder of greater internal diameter than the branch of said T mounted thereon and communicating thereby with said line, an internal flange in said cylinder, a piston valve freely movable in said cylinder between its lower end and said flange, a hollow belt on said cylinder intermediate its chamber in communication with the interior of said cylinder, said piston valve normally closing such communication but adapted to move under increase of pressure in said line to open said communication, and an air chamber communicating with the interior of said cylinder whereby the movement of said piston valve is regulated.

2. In a pressure control device for a pipe line system including a low pressure feed line and a high pressure delivery line and a pump to take liquid from said low pressure line and deliver the same to said high pressure line, a bypass connecting said lines, a floating relief valve balanced between the liquid pressure in said high pressure line and a pneumatic pressure proportioned to its own movement to control said bypass, and means for regulating said pneumatic pressure.

3. In a pressure control device for a pipe line system including a low pressure feed line and a high pressure delivery line and a pump to take fluid from said low pressure line and deliver the same into said high pressure line, a cylinder connected into said high pressure line, a bypass conduit from a port in said cylinder to said low pressure line, a movable member in said cylinder balanced between the high pressure and a pneumatic pressure in said cylinder, said member controlling the admission of fluid from said high pressure line through said port into said bypass conduit, and means to indicate the position of said member in said cylinder.

4. In a maximum pressure control device for a high pressure pipe line which receives fluid from a pump fed from a low pressure pipe line, a cylinder communicating with said high pressure pipe line at one end and closed against the atmosphere at the other end, a discharge port in said cylinder intermediate its ends, a movable piston in said cylinder floating between the high pressure at one side and a pneumatic pressure in the closed end of said cylinder at the other side, said piston normally closing said port and adapted to be moved against the action of said pneumatic pressure to uncover said port, a bypass conduit from said port to the low pressure line, and means whereby to regulate the pneumatic pressure existent at the moment when said piston will uncover said port.

5. In a pressure control device for an oil pipe line, a T in said line, a cylinder mounted on the side connection of said T and thereby communicating with said line, said cylinder being closed to the atmosphere at its upper end to form a pneumatic cushion, a port on said cylinder intermediate its ends, a piston valve in said cylinder movable to a position of equilibrium between said high pressure and the pneumatic pressure established in said cylinder by its own movement to cover and uncover the opening of the said port, a graduated rod fastened to said piston valve and passing through said T and the oil in said pipe line and issuing through the wall thereof opposite said side connection to indicate at the exterior the position of said piston valve in said cylinder.

6. In a pressure control device for a pipe line, including a low pressure feed line and a high pressure delivery line and a pump to take fluid from said low pressure line and deliver the same to said high pressure line, a cylinder having ports in its walls, a piston valve free to move in said cylinder, means to establish a pneumatic cushion in said cylinder, and means to establish a pressure upon the side of said piston opposite said cushion proportionate to the pressure in said high pressure line, said piston being moved by a pressure in said line in excess of a predetermined maximum pressure into a position to uncover said ports.

7. In a pressure controlled device for a pipe line including a low pressure feed line and a high pressure delivery line and a pump to take fluid from said low pressure line and deliver it into said high pressure line, a cylinder communicating with said high pressure line at one end, a valve piston free to move in said cylinder, said cylinder having a relief port and means to establish communication between said port and said low pressure line, said cylinder being closed at its other end to establish a pneumatic cushion upon said valve piston, means to establish a pneumatic pressure within said cylinder independent of the position of said valve piston, said valve piston by its movement increasing said pneumatic pressure to a predetermined maximum, said piston being held by said pneumatic cushion in a closing position with respect to said relief port, said piston being moved by said high pressure to uncover said relief port at said predetermined maximum pressure, and means to indicate the position of said valve piston in said cylinder.

8. In a pressure controlled device for a pipe line including a low pressure feed line and a high pressure delivery line and a pump to take fluid from said low pressure line and deliver it to said high pressure line, and having a port intermediate its length, a bypass conduit from said port to said low pressure line, a valve piston freely movable in said cylinder and balanced between the high pressure and a pneumatic pressure in said cylinder, said valve piston controlling the admission of fluid from said high pressure line through said port into said conduit, and means whereby to vary said pneumatic pressure independent of the movement of said piston.

9. In a pressure controlled device for a pipe line, a pipe connection in said line having a branch conduit, a cylinder of greater internal diameter than the branch conduit and mounted by one end of said pipe connection and communicating thereby with said line, a piston valve freely movable in said cylinder, closing means for the other end of the cylinder whereby to establish a pneumatic cushion on the side of said valve piston opposite the side in contact with the fluid from said high pressure line, a port in said cylinder intermediate its length, and means establishing communication between said port and said low pressure line, said piston being limited in its movement by said pneumatic cushion by the walls of said branch conduit.

10. In a pressure controlled device for a pipe line including a low pressure feed line and a high pressure delivery line and a pump to take fluid from said low pressure line and deliver it to said high pressure line, a cylinder communicating with said high pressure line at one end and having a relief port intermediate its ends and being closed at its other end to form a pneumatic cushioning, a valve piston freely movable in said cylinder to normally close said port and adapted upon a predetermined maximum pressure in said high pressure line to move against the action of said pneumatic cushion to uncover said port, and means communicating with said cylinder to supply oil above said piston and to regulate the pressure of said pneumatic cushion.

11. In a pressure control device for a pipe line, a T in said line, a cylinder of greater internal diameter than the branch of said T mounted thereon and communicating thereby with said line, an inwardly projecting member in said cylinder, a piston valve freely movable in said cylinder and limited in its movement by said T and said member, a port through the wall of said cylinder, said piston valve normally closing such port but adapted to move under increase of pressure in said line to uncover said port, and an air chamber communicating with the interior of said cylinder to control the movement thereof as produced by the pressure in said line.

In testimony whereof, I affix my signature.

HENRY G. MOBLEY.